(12) United States Patent
Chiang et al.

(10) Patent No.: US 10,959,053 B1
(45) Date of Patent: Mar. 23, 2021

(54) LOCATION INFORMATION FOR USER EQUIPMENT CONNECTED TO A WIRELESS NETWORK

(71) Applicant: Verizon Patent and Licensing Inc., Arlington, VA (US)

(72) Inventors: David Chiang, Fremont, CA (US); Jin Yang, Orinda, CA (US); Arda Aksu, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/668,349

(22) Filed: Oct. 30, 2019

(51) Int. Cl.
*H04W 4/02* (2018.01)
*H04W 72/04* (2009.01)
*H04W 64/00* (2009.01)

(52) U.S. Cl.
CPC ......... *H04W 4/026* (2013.01); *H04W 64/006* (2013.01); *H04W 72/042* (2013.01); *H04W 72/044* (2013.01)

(58) Field of Classification Search
CPC . H04W 4/026; H04W 72/044; H04W 72/042; H04W 64/006

USPC ..... 455/414.1–414.2, 450–452.2, 456.1–457
See application file for complete search history.

(56) References Cited

U.S. PATENT DOCUMENTS

| | | | | |
|---|---|---|---|---|
| 8,532,041 | B1* | 9/2013 | Lambert | H04W 16/14 370/329 |
| 2009/0303129 | A1* | 12/2009 | Sairo | G01S 19/25 342/386 |
| 2012/0326922 | A1* | 12/2012 | Yang | G01S 19/49 342/357.3 |
| 2014/0302854 | A1* | 10/2014 | Wei | H04W 88/06 455/436 |

* cited by examiner

*Primary Examiner* — Michael Y Mapa

(57) ABSTRACT

An illustrative system includes a network device, of a wireless network, configured to determine location information associated with a user equipment (UE) connected to the wireless network, encode the location information in a resource assignment signal configured to assign a resource of the wireless network for use by the UE, and transmit the resource assignment signal including the encoded location information to the UE. The UE may be configured to receive the transmitted resource assignment signal including the encoded location information, decode the encoded location information, and use the location information for one or more operations of the UE, such as to determine a geographic location of the UE.

20 Claims, 12 Drawing Sheets

900

| Direction | Pattern |
|---|---|
| Direction 1 | Pattern 1 |
| Direction 2 | Pattern 2 |
| Direction 3 | Pattern 4 |
| Direction 5 | Pattern 6 |
| Direction 7 | Pattern 7 |
| Direction 8 | Pattern 8 |
| ... | ... |
| Direction N | Pattern N |

LOCATION INFORMATION FOR USER EQUIPMENT CONNECTED TO A WIRELESS NETWORK

BACKGROUND INFORMATION

Wireless communication networks, such as 4G (fourth generation) and 5G (fifth generation) networks, allow user equipment (UE) to wirelessly connect to the networks and access information, services, applications, etc. provided over the networks. It is desirable to improve the technologies used to implement the wireless communication networks, as well as the information, services, applications, etc. provided over the networks.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9 depicts an illustrative data structure that maps directions to patterns of physical resource block assignments according to principles described herein.

DETAILED DESCRIPTION OF PREFERRED EMBODIMENTS

Figure 1:
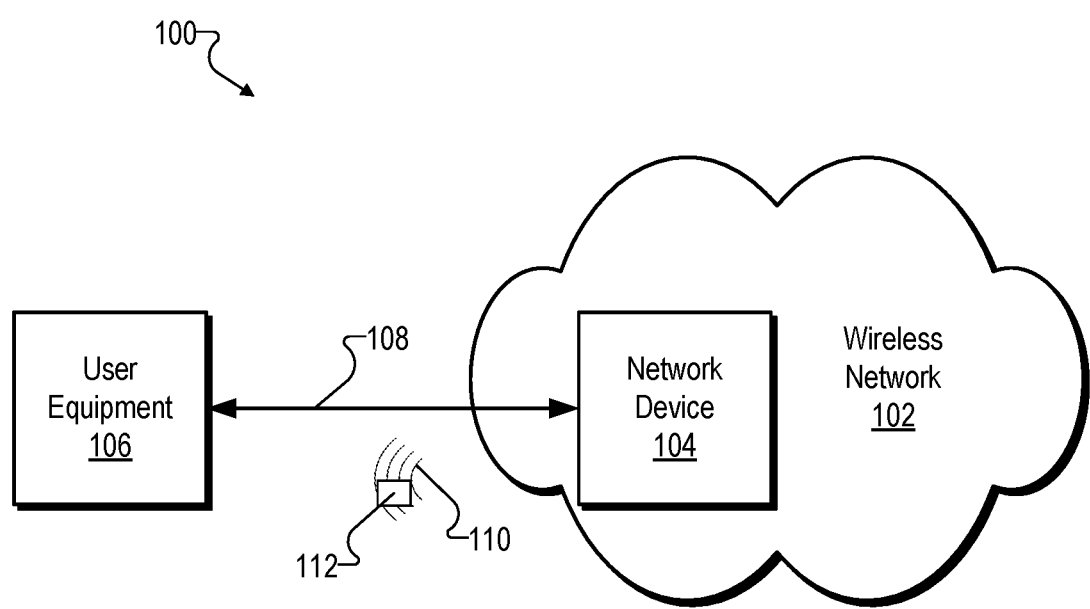
FIG. 1 depicts an illustrative network environment in which location information for user equipment may be determined, communicated, and/or used according to principles described herein.

Systems and methods described herein are configured to determine, communicate, and/or use location information for user equipment (UE) connected to a wireless network in one or more novel and advantageous ways. For example, systems and methods described herein may be configured to determine location information associated with a UE connected to a wireless network, encode the location information in a resource assignment signal configured to assign a resource of the wireless network for use by the UE, and transmit the resource assignment signal including the encoded location information to the UE. The UE may be configured to receive the transmitted resource assignment signal including the encoded location information, decode the encoded location information, and use the location information for one or more operations of the UE, such as to determine a geographic location of the UE. The determined geographic location may be used for various services accessible by the UE over the wireless network.

The resource assignment signal may be leveraged by systems and methods described herein to provide additional information (e.g., location information and/or any information other than resource assignment information) to the UE. In certain examples, the resource assignment signal includes a physical resource assignment signal configured to assign a physical resource (e.g., a physical resource element, a physical resource slot, a physical resource block, etc.) of the wireless network for use by the UE. In certain examples, the location information is encoded as a pattern of physical resource assignments in the physical resource assignment signal, such as a pattern of physical resource block (PRB) assignments encoded to indicate the location information. The additional information may be encoded in a single instance of a resource assignment signal, such as a single PRB assignment signal, or across a set of multiple resource assignment signals conveyed over a period of time, such as a collection of PRB assignment signals conveyed over a period of time.

In certain examples, systems and methods described herein may be configured to perform one or more of the above-described operations at a physical layer (layer-1) of a protocol stack of the wireless network. Accordingly, one or more of the operations may be performed at layer-1 speeds that support high resolution of the location information, such as at speeds at the physical layer that are faster than speeds of operations performed at higher layers of the protocol stack. For example, the location information may be encoded in PRB assignments (e.g., PRB assignment frames) that are generated and transmitted, at the physical layer, at least every ten milliseconds, and even every millisecond, in certain illustrative implementations. In addition, the UE may decode and potentially use the location information at the physical layer (e.g., at a modem level).

In certain examples, systems and methods described herein may be configured to perform one or more of the above-described operations without changing other operations of the wireless network, such as operations that are performed in accordance with proposed standards for wireless networks. For example, the location information may be encoded as patterns of PRB assignments (e.g., in a single PRB assignment signal or across a set of PRB assignment signals conveyed over a period of time) in a manner that complies with and does not change proposed standards and/or normal operations of the wireless network (e.g., proposed standards for making PRB assignments).

The location information may include any location information for the UE that is determined by one or more network devices of the wireless network. In certain examples, the location information may include a direction of movement of the UE, which direction may be determined by the one or more network devices based on a deterministic direction of a narrow, directed radio beam (e.g., a millimeter wave radio beam) serving the UE and a change in signal strength of the directed radio beam received by the UE. For example, a radio beam may be emitted in a particular direction (e.g., a particular compass point direction). If the signal strength of the radio beam received by the UE decreases over sampling times, the UE may be determined to be moving away from the beam transmitter, such as in the same direction in which the beam is emitted. If, on the other hand, the signal strength of the radio beam received by the UE increases over sampling times, the UE may be determined to be moving toward the beam transmitter, such as in the opposite direction in which the beam is emitted.

The direction of movement of the UE may be determined relative to a single directed radio beam such as the millimeter wave radio beam that is being used for communications between a network device and the UE. Alternatively, the direction of movement of the UE may be determined relative to multiple directed radio beams such as multiple millimeter wave radio beams received by the UE and for which the UE measures and reports signal strengths to one or more network devices. Examples of a network device determining a direction of movement of the UE are described herein.

As mentioned, the geographic location of a (UE) connected to a wireless network may be determined and used for various services provided over the wireless network. The reliability, accuracy, and resolution with which the geographic location of the UE is determined may affect the quality of the services and/or a user's experience with the services. Location information that is determined, encoded, and transmitted to a UE as described herein may enhance the reliability, accuracy, and/or resolution with which the geographic location of the UE is determined. For example, the UE may be a mobile device equipped with Global Positioning System (GPS) capabilities that are used to determine the geographic location of the UE. The determined geographic location of the UE may be used by the UE and/or for services provided to the UE over the wireless network. However, GPS signals may not be sufficiently accessible in certain locations, such as inside a building or a tunnel, for example. When the UE is located at a location at which sufficient GPS signals are unavailable, the UE may not be able to accurately and reliably determine the geographic location of the UE, especially when the UE moves within the location without having access to sufficient GPS signals. In such situations, other location information that is determined, encoded, and transmitted to the UE as described herein may enhance the reliability, accuracy, and/or resolution with which the geographic location of the UE is determined.

To illustrate, a UE equipped with GPS capabilities may enter a tunnel in which GPS signals are not received by the UE. The UE may be connected to the wireless network by way of a radio beam that is emitted in the tunnel. One or more network devices of the wireless network may determine a direction of movement of the UE in the tunnel based on a deterministic direction of the radio beam serving the UE and a change in signal strength of the radio beam received by the UE as the UE moves in the tunnel. The one or more network devices may encode and transmit the determined direction of movement of the UE to the UE in a resource assignment signal. The UE may receive, decode, and use the direction of movement of the UE to determine a geographic location of the UE. For example, the UE may use the direction of movement together with other information determined by the UE, such as a last-known GPS location and/or a speed of travel of the UE, to estimate a geographic location of the UE.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 depicts an illustrative network environment 100 in which location information for user equipment may be determined, communicated, and/or used as described herein. As shown, network environment 100 includes a wireless network 102, a network device 104 of the wireless network 102, and a UE 106 connected to the wireless network 102 by way of a connection 108 with the network device 104. FIG. 1 also shows a wireless signal 110 transmitted from network device 104 to UE 106 by way of connection 108. Wireless signal 110 may carry information 112 from network device 104 to UE 106. As described herein, wireless signal 110 may include a resource assignment signal (e.g., a PRB assignment signal) carrying resource assignment information and other information 112, which other information 112 may include location information for UE 106.

Wireless network 102 may include any configuration of network devices that provides a wireless communication network to which appropriately configured user equipment may wirelessly connect and access services provided over wireless network 102. Wireless network 102 may include one or more suitable wireless communication networks, including a mobile network, a cellular network, a wide area network, a fifth generation new radio (5G NR) network, a fourth generation (4G) Long Term Evolution (LTE) network, a 4.5G LTE network, a Voice over IP (VoIP) network, a Voice over LTE (VoLTE) network, a radio frequency (RF) network, a millimeter wave radio network, a high frequency band radio network, any other suitable wireless communication network, and/or any combination thereof.

Network device 104 may include any device or configuration of devices configured to provide features and/or perform operations of wireless network 102. For example, network device 104 may include or be part of a base station, a radio access network (RAN), a base band unit (BBU), a remote radio head (RRH), a NodeB (e.g., an enhanced NodeB or a next generation NodeB) node, one or more radio antennas (e.g., at least one radio antenna array), a user plane function (UPF) node, a session management function (SMF) node, an access management function (AMF) node, a packet gateway (P-GW) node, a serving gateway (S-GW) node, a mobility management entity (MME) node, any other wireless network element, and/or any suitable combination thereof.

In certain examples, network device 104 is implemented at an edge of wireless network 102 and is configured to perform operations to support wireless communications being transmitted to and received from UEs connected to and/or attempting to connect to wireless network 102. For example, network device 104 may include an RRH that transmits and receives radio frequency (RF) signals to/from UEs such as UE 106. Such an RRH may include at least one antenna array, transceiver circuitry, and other hardware and software components for enabling the RRHs to receive data via wireless RF signals from UE 106 and to transmit wireless RF signals to UE 106.

In certain examples, network device 104 is configured to transmit and receive radio beams that can be emitted in specific directions, such as narrow beams in high frequency bands. For example, network device 104 may be configured to transmit and receive millimeter wave radio beams in frequency bands in the range of 30-300 GHz and/or in the range of 24-30 GHz (e.g., a frequency band from 27.5-28.35 GHz referred to as the 28 GHz band). Network device 104 may be configured to perform beam management operations for such radio beams, including beamforming, beam scanning, beam tracking, beam synchronization, and/or one or more other radio beam operations to facilitate radio-beam-based communication with UE 106.

Connection 108 may include any suitable wireless communication connection that supports wireless communications between network device 104 and UE 106. For example, connection 108 may include RF beams that are transmitted and received by network device 104 and UE 106 at specific frequencies and during specific time slots. The RF beams may carry signals between network device 104 and UE 106, and the signals may carry information encoded in the signals. In certain examples, the RF beams are narrow, high-band frequency beams emitted at specific directions. For example, the RF beams may include millimeter wave radio beams in high frequency bands within the ranges mentioned above. Through beam management operations, network device 104 and UE 106 may select and utilize a specific RF beam or set of RF beams to use for connection 108.

Although FIG. 1 shows a single network device 104, this is for simplicity of illustration and description. Network device 104 may represent one or more network devices of wireless network 102 that are configured to perform one or more of the network-side operations described herein.

Figure 2:
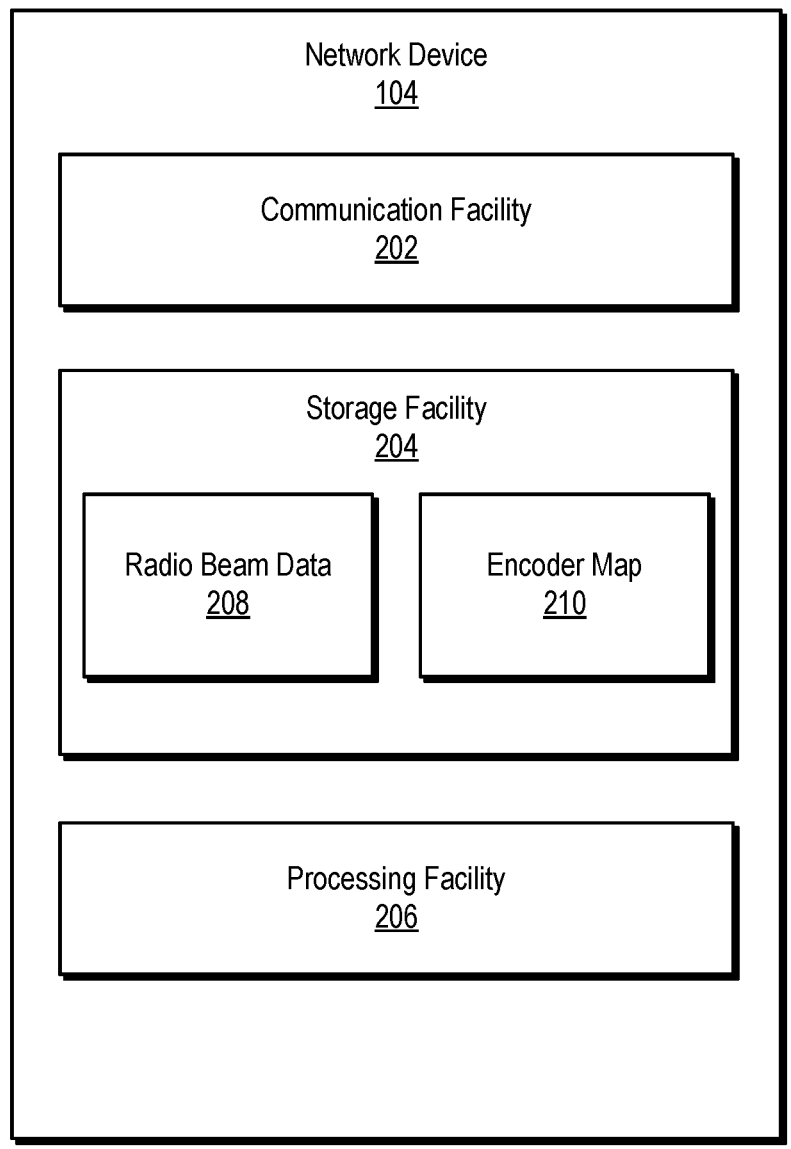
FIG. 2 depicts illustrative components of a network device according to principles described herein.

FIG. 2 depicts illustrative components of network device 104. As shown in FIG. 2, network device 104 may include, without limitation, a communication facility 202, a storage facility 204, and a processing facility 206 selectively and communicatively coupled to one another. Facilities 202-206 may each include or be implemented by one or more physical computing devices including hardware and/or software components such as processors, memories, storage drives, communication interfaces, instructions stored in memory for execution by the processors, and so forth. Although facilities 202-206 are shown to be separate facilities in FIG. 2, facilities 202-206 may be combined into fewer facilities, such as into a single facility, or divided into more facilities as may serve a particular implementation. In some examples, each of facilities 202-206 may be distributed between multiple devices and/or multiple locations as may serve a particular implementation.

Communication facility 202 may communicate with other elements of wireless network 102 and with UE 106 using any suitable communication technologies. Communication facility 102 may send and receive any suitable wireless signals to/from UE 106 by way of suitable radio signals (e.g., millimeter wave radio signals). To this end, communication 202 facility may include or be communicatively coupled to one or more antennas (e.g., antennas of at least one antenna array) that are configured to emit radio beams in deterministic directions.

Storage facility 204 may maintain any data received, generated, managed, used, and/or transmitted by processing facility 206. For example, storage facility 204 may store radio beam data 208 and an encoder map 210.

Radio beam data 208 may include information about communication facility 202, such as information about antennas included in or communicatively coupled to communication facility 202 and/or radio beams transmitted and/or received by the antennas. In certain examples, radio beam data 208 indicates directions associated with radio beams and/or antennas transmitting the radio beams, such as directions in which the radio beams are emitted and/or the antennas are pointed.

Encoder map 210 may include information that may be used by processing facility 206 to encode information before the information is provided, by way of a signal transmitted by communication facility 202, to UE 106. For example, encoder map 210 may include a data structure (e.g., a table) specifying mappings of directions to codes. Accordingly, processing facility 206 may use the encoder map 210 to encode a direction as a code that may be transmitted in a signal to UE 106.

Storage facility 204 may maintain (e.g., store) executable data used by processing facility 206 to perform any of the functionality described herein. For example, storage facility 204 may store instructions that may be executed by processing facility 206 to perform one or more of the operations described herein. The instructions may be implemented by any suitable application, software, code, and/or other executable data instance.

Processing facility 206 may be configured to perform (e.g., execute instructions stored in storage facility 204 to perform) one or more of the network-side operations described herein. For example, processing facility 206 may be configured to determine location information associated with UE 106, encode the location information in a resource assignment signal configured to assign a resource of wireless network 102 for use by UE 106, and transmit the resource assignment signal including the encoded location information to UE 106. Examples of these operations are described in detail herein.

Returning to FIG. 1, UE 106 may include any device or configuration of devices configured to wirelessly connect to wireless network 102. UE 106 may include a mobile device, a smartphone, a tablet computer, a laptop computer, an Internet of Things (IoT) device, a vehicle, any suitable computing device, and/or any combination thereof.

In certain examples, UE 106 is configured to transmit and receive radio beams that can be emitted in specific directions, such as narrow beams in high frequency bands. For example, UE 106 may be configured to transmit and receive millimeter wave radio beams in high frequency bands within any of the ranges mentioned above. UE 106 may be configured to perform beam management operations for such radio beams, including beamforming, beam scanning, beam tracking, beam synchronization, and/or one or more other radio beam operations to facilitate radio-beam-based communication with network element 104.

Although FIG. 1 shows a single UE 106, this is for simplicity of illustration and description. UE 106 may represent one or more UE devices that are configured to perform one or more of the UE-side operations described herein.

Figure 3:
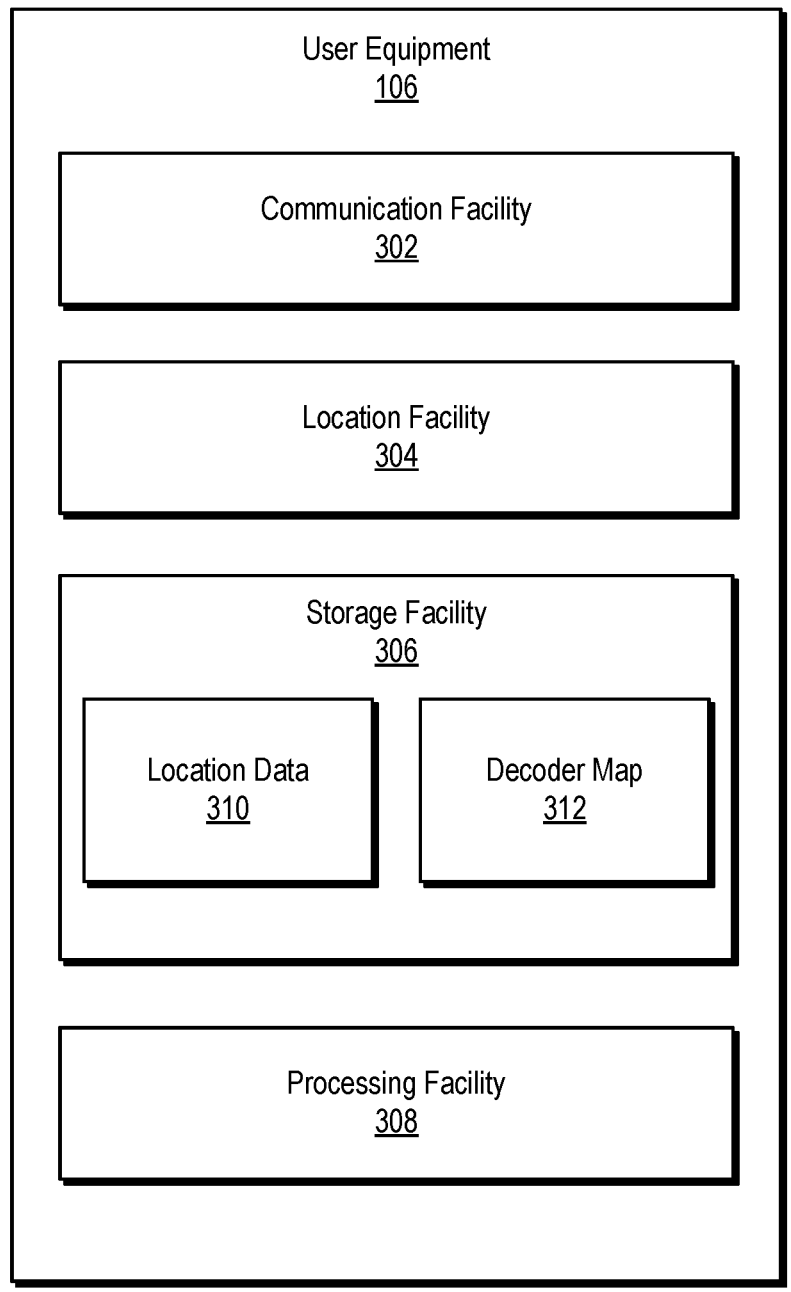
FIG. 3 depicts illustrative components of a user equipment device according to principles described herein.

FIG. 3 depicts illustrative components of UE 106. As shown in FIG. 3, UE 106 may include, without limitation, a communication facility 302, a location facility 304, a storage facility 306, and a processing facility 308 selectively and communicatively coupled to one another. Facilities 302-308 may each include or be implemented by one or more physical computing devices including hardware and/or software components such as processors, memories, storage drives, communication interfaces, instructions stored in memory for execution by the processors, and so forth. Although facilities 302-308 are shown to be separate facilities in FIG. 3, facilities 302-308 may be combined into fewer facilities, such as into a single facility, or divided into more facilities as may serve a particular implementation. In some examples, each of facilities 302-308 may be distributed between multiple devices and/or multiple locations as may serve a particular implementation.

Communication facility 302 may communicate with network device 104 using any suitable communication technologies. Communication facility 302 may send and receive any suitable wireless signals to/from network device 104 by way of radio signals (e.g., millimeter wave radio beams). To this end, communication 302 facility may include or be communicatively coupled to one or more antennas that are configured to emit radio beams in specific directions.

Location facility 304 may be configured to determine a geographic location of UE 106 in any suitable way. For example, location facility 304 may include GPS hardware and/or software configured to receive and use GPS signals to determine a geographic location (e.g., GPS coordinates) of UE 106. Additionally or alternatively, location facility 304 may be configured to use triangulation principles to determine a geographic location of UE 106 based on wireless signals received by UE 106. Additionally or alternatively, location facility 304 may include one or more sensors (e.g., motion sensors) configured to sense information about UE 106 and to use the sensed information together with location information to determine a geographic location of UE 106.

Additionally or alternatively, location facility 304 may be configured to use location information received from network device 104 and decoded by UE 106, together with other information about UE 106, to determine a geographic location of UE 106. For instance, location facility 304 may be configured to use the location information received from network device 104 in combination with a last-known geographic location of UE 106 (e.g., a last-known GPS location of UE 106), a speed of movement of UE 106 (e.g., a speed measured by a sensor of UE 106), and/or other information about UE 106 to determine a geographic location of UE 106. In certain examples, location facility 304 may be configured to perform a "dead reckoning" process to determine a geographic location of UE 106 based on any information about UE 106 (e.g., a speed and a direction of UE 106) that may be used to determine the geographic location of UE 106, including location information received from network device 104.

Storage facility 306 may maintain any data received, generated, managed, used, and/or transmitted by processing facility 308. For example, storage facility 306 may store location data 310 and a decoder map 312.

Location data 310 may include information about the geographic location of UE 106 and/or information that may be used by UE 106 to determine the geographic location of UE 106, such as information about a last-known geographic location of UE 106 (e.g., as determined based on GPS and/or triangulation signals) and/or motion of UE 106 (e.g., as determined from or represented by sensor data from one or more sensors included in location facility 304). Additionally, location data 310 may represent location information received from network device 104 and decoded by UE 106 as described herein.

Decoder map 312 may include information that may be used by processing facility 308 to decode information. For example, decoder map 312 may include a data structure (e.g., a table) specifying mappings of codes to location information such as directions of movement. Accordingly, processing facility 306 may use decoder map 312 to decode encoded information such as encoded location information to determine location information received from network device 104, such as a direction of movement of UE 106.

Decoder map 312 may be implemented by UE 106 in any suitable configuration and/or manner. For example, decoder map 312 may be stored in storage facility 306 as part of manufacture of UE 106 or a hardware component of UE 106 (e.g., a modem chipset of UE 306) and/or as part of configuration of UE 106 to connect with wireless network 102. As another example, decoder map 312 may be provided to UE 106 by a network device of wireless network 102 at any suitable time, such as during initialization, signal acquisition, connection, signal handoff, and/or operation of UE 106. Decoder map 312 may be globally applicable across wireless network 102 or may be specific to a particular subset or component of wireless network 102 such as network device 104 or a specific antenna (e.g., a specific antenna in an antenna array).

Storage facility 306 may maintain (e.g., store) executable data used by processing facility 308 to perform any of the functionality described herein. For example, storage facility 306 may store instructions that may be executed by processing facility 308 to perform one or more of the operations described herein. The instructions may be implemented by any suitable application, software, code, and/or other executable data instance.

Processing facility 308 may be configured to perform (e.g., execute instructions stored in storage facility 306 to perform) one or more of the UE-side operations described herein. For example, processing facility 308 may be configured to receive, from network device 104, a transmitted resource assignment signal including encoded location information, decode the encoded location information, and use the location information for one or more operations of UE 106, such as to determine a geographic location of UE 106. Processing facility 308 may then use the determined geographic location for various services accessible by UE 106 over wireless network 102. Examples of these operations are described in detail herein.

Figure 4:
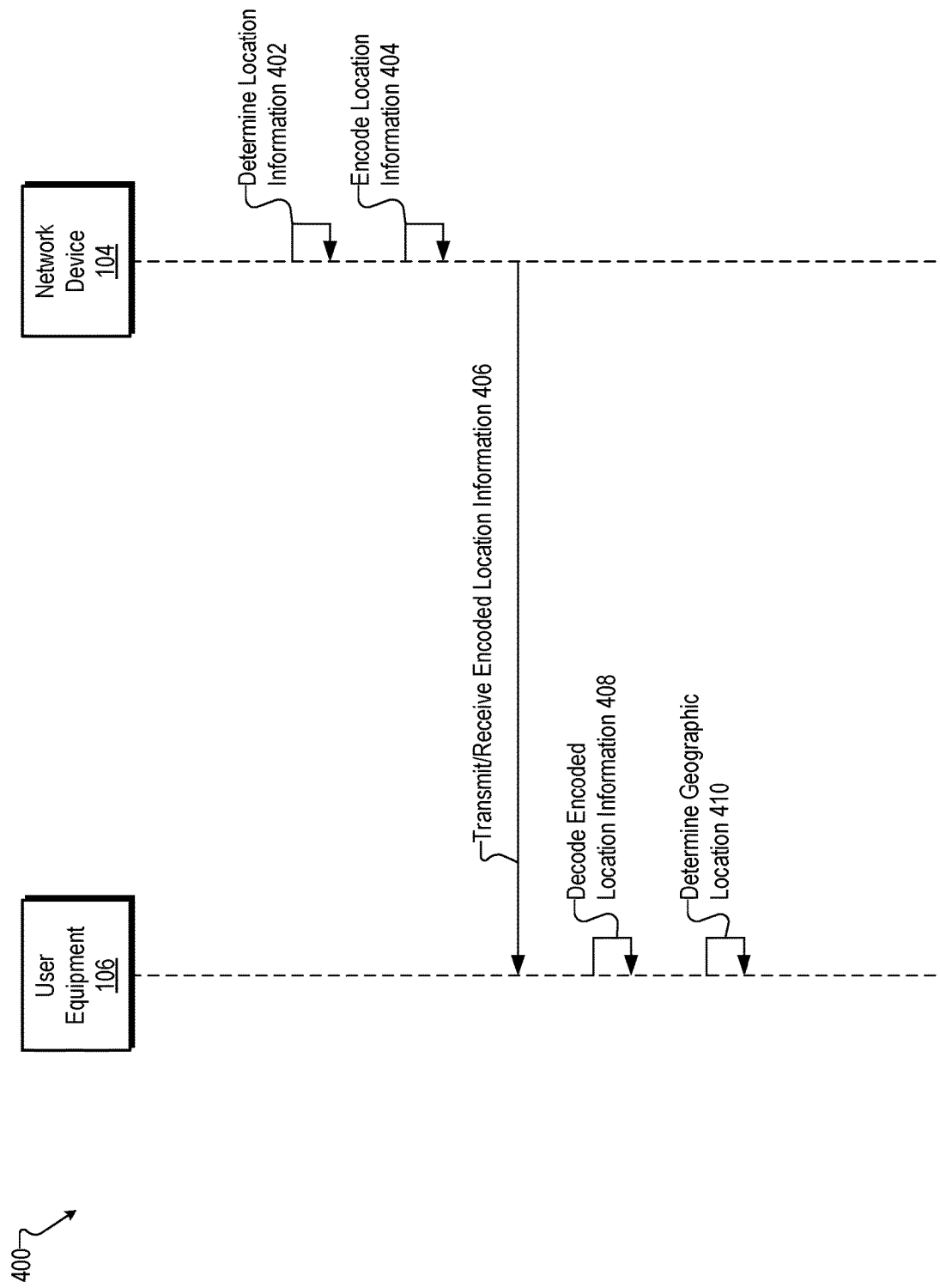
FIG. 4 depicts an illustrative flow of operations performed by a network device and a user equipment device according to principles described herein.

FIG. 4 depicts an illustrative operation flow 400 performed by network device 104 and UE 106. As shown, network device 104 may determine location information for UE 106 in operation 402, encode the location information in operation 404, and transmit the encoded location information to UE 106 in operation 406. UE 406 may receive the encoded location information in operation 406, decode the encoded location information in operation 408, and determine a geographic location of UE 106 based on the decoded location information in operation 410.

Network device 104 may determine location information for UE 106 in any suitable way. In certain examples, the location information includes a direction of movement of UE 106. Examples of network device 104 determining location information that includes a direction of movement of UE 106 will now be described in reference to FIGS. 5-7, which depict illustrative configurations of radio beams relative to UE 106.

Figure 5:
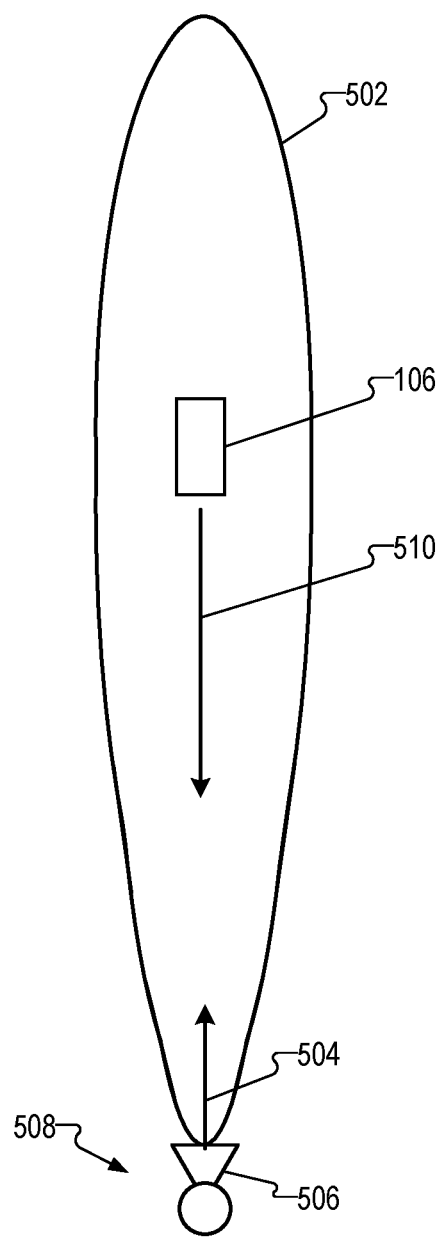
FIGS. 5-7 depict illustrative configurations of radio beams relative to a user equipment device according to principles described herein.

FIG. 5 illustrates a radio beam 502 emitted in a direction 504 by an antenna 506 included in a radio beam transmitter 508. Radio beam 502 may be a narrow beam in a high frequency band that can be emitted in a specific direction, such as a millimeter wave radio beam. Radio beam 502 may be one beam emitted from a radio head at a base station of wireless network 102. The base station may be configured to emit any number of radio beams in any set of directions. For example, network device 104 may include an antenna array that emits radio beams in multiple different directions, and radio beam 502 may represent one of those beams emitted by one antenna 506 included in the antenna array. Alternatively, network device 104 may include a single antenna 506 configured to emit a single radio beam 502 in a particular direction (e.g., in a direction through a tunnel).

FIG. 5 further illustrates UE 106 located within the footprint of radio beam 502 and moving in a direction 510 toward antenna 506, which in this example is the opposite direction in which radio beam 502 is emitted. UE 106 may sample strengths of radio beam 502 received by UE 106 over time and report the sampled signal strengths to network device 106. As UE 106 moves closer to antenna 506, the sampled signal strengths will increase in strength.

Network device 104 may receive the reported signal strengths from UE 106 and use the reported signal strengths to determine a direction of movement of UE 106. For example, network device 104 may maintain or access information about antenna 506 and/or radio beam 502 (information included in radio beam data 208), which information may indicate the direction 504 in which radio beam 502 is emitted. Network device 104 may determine, from this information, that UE 106 is moving either away from or toward antenna 506. More specifically, network device 104 may determine that UE 106 is moving either in direction 504 or direction 510. In certain examples, such a determination may be based on knowledge that radio beam 502 is emitted in a location in which available directions of movement of UE 106 are constrained, such as in a tunnel in which available directions of movement of UE 106 are likely linear, in direction 504 or direction 510.

Network device 104 may be configured to use the reported signal strengths to determine whether UE 106 is moving away from antenna 506 in direction 504, is moving toward antenna 506 in direction 510, or is not moving away from or toward antenna 506. If the signal strength of radio beam 502 received by UE 106 decreases by at least a threshold over sampling times, network device 104 may determine that UE 106 is moving away from antenna 506 in direction 504. If the signal strength of radio beam 502 received by UE 106 increases by at least a threshold over sampling times, network device 104 may determine that UE 106 is moving toward antenna 506 in direction 510. If the signal strength of radio beam 502 received by UE 106 does not change by at least a threshold over sampling times, network device 104 may determine that UE 106 is stationary relative to antenna 506.

In the example depicted in FIG. 5, network device 104 may determine that UE 106 is moving toward antenna 506 in direction 510. Network device 104 may include the determined direction 510 of movement of UE 106 in the location information determined by network device 104.

In certain examples, network device 104 may determine additional information to be included in the location information. For example, network device 104 may be configured to determine a speed of movement of UE 106 based on a rate of change of signal strengths of radio beam 502 reported by UE 106.

FIG. 5 represents an example in which network device 104 determines a direction of movement of UE 106 based on reported signal strengths of a single radio beam 502. In other examples, network device 104 may determine a direction of movement of UE 106 based on reported signal strengths of multiple radio beams received by UE 106.

Figure 6:
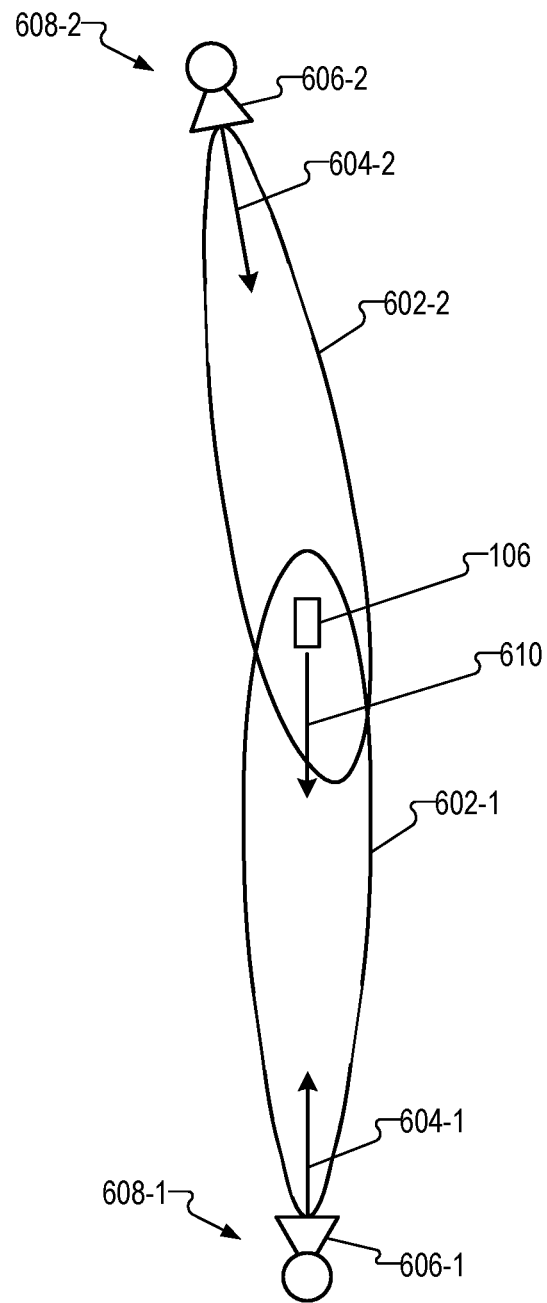

FIG. 6 illustrates radio beams 602-1 and 602-2 (collectively "radio beams 602") emitted in directions 604-1 and 604-2 (collectively "directions 604") by antennas 606-1 and 606-2 (collectively "antennas 606") included in radio beam transmitters 608-1 and 608-2 (collectively "radio beam transmitters 608"). Radio beams 602 may be narrow beams in high frequency bands that can be emitted in specific directions, such as millimeter wave radio beams.

FIG. 6 further illustrates UE 106 located within the footprints of radio beams 602 and moving in a direction 610 toward antenna 606-1 and away from antenna 606-2. UE 106 may sample strengths of radio beams 602 received by UE 106 over time and report the sampled signal strengths to one or more network devices of wireless network 102, such as network device 104. As UE 106 moves closer to antenna 606-1 and farther from antenna 606-2, the sampled signal strengths of radio beam 602-1 will increase and the sampled signal strengths of radio beam 602-2 will decrease.

Network device 104 may receive the signal strengths reported by UE 106 directly from UE 106 and/or from one or more other network devices. Network device 104 may use the reported signal strengths to determine a direction of movement of UE 106. For example, network device 104 may maintain or access information about antennas 606 and/or radio beams 602, which information may indicate the directions 604 in which radio beams 602 are emitted. Network device 104 may determine, from this information and signal strengths reported by UE 106, a direction of movement of UE 106. For example, network device 104 may determine that UE 106 is moving either in direction 604-2 or direction 610 based on reported signal strengths of radio beam 602-1 increasing and reported signal strengths of radio beam 602-2 decreasing over time. In certain examples, such a determination may be based on knowledge that radio beam 602 is emitted at a location in which directions of movement of UE 106 are constrained, such as in a tunnel in which available directions of movement of UE 106 likely follow the tunnel, in direction 604-2 or direction 610. Network device 104 may be configured to analyze the reported signal strengths, and based on the analysis, select direction 604-2 or direction 610 as the direction of movement of UE 106. Such an analysis may be performed in any way suitable to select a direction of movement from multiple potential directions of movement. For example, reported signal strengths of radio beams 602 may be compared and the results used to determine whether the direction of movement of UE 106 is more aligned with one potential direction of movement than with another potential direction of travel.

In the example depicted in FIG. 6, network device 104 may determine that UE 106 is moving toward antenna 606-1 in direction 610. Network device 104 may include the determined direction 610 of movement of UE 106 in the location information determined by network device 104.

In certain examples, network device 104 may determine additional information to be included in the location information. For example, network device 104 may be configured to determine a speed of movement of UE 106 based on a rate of change of signal strengths of radio beams 602 reported by UE 106.

FIG. 6 represents an example in which network device 104 determines a direction of movement of UE 106 based on reported signal strengths of two radio beams 602. In other examples, network device 104 may determine a direction of movement of UE 106 based on reported signal strengths of three or more radio beams received by UE 106. Such examples may allow for triangulation principles to be used to determine location information for UE 106, which information may include a direction of movement, a speed, and/or an estimated geographic location of UE 106.

Figure 7:
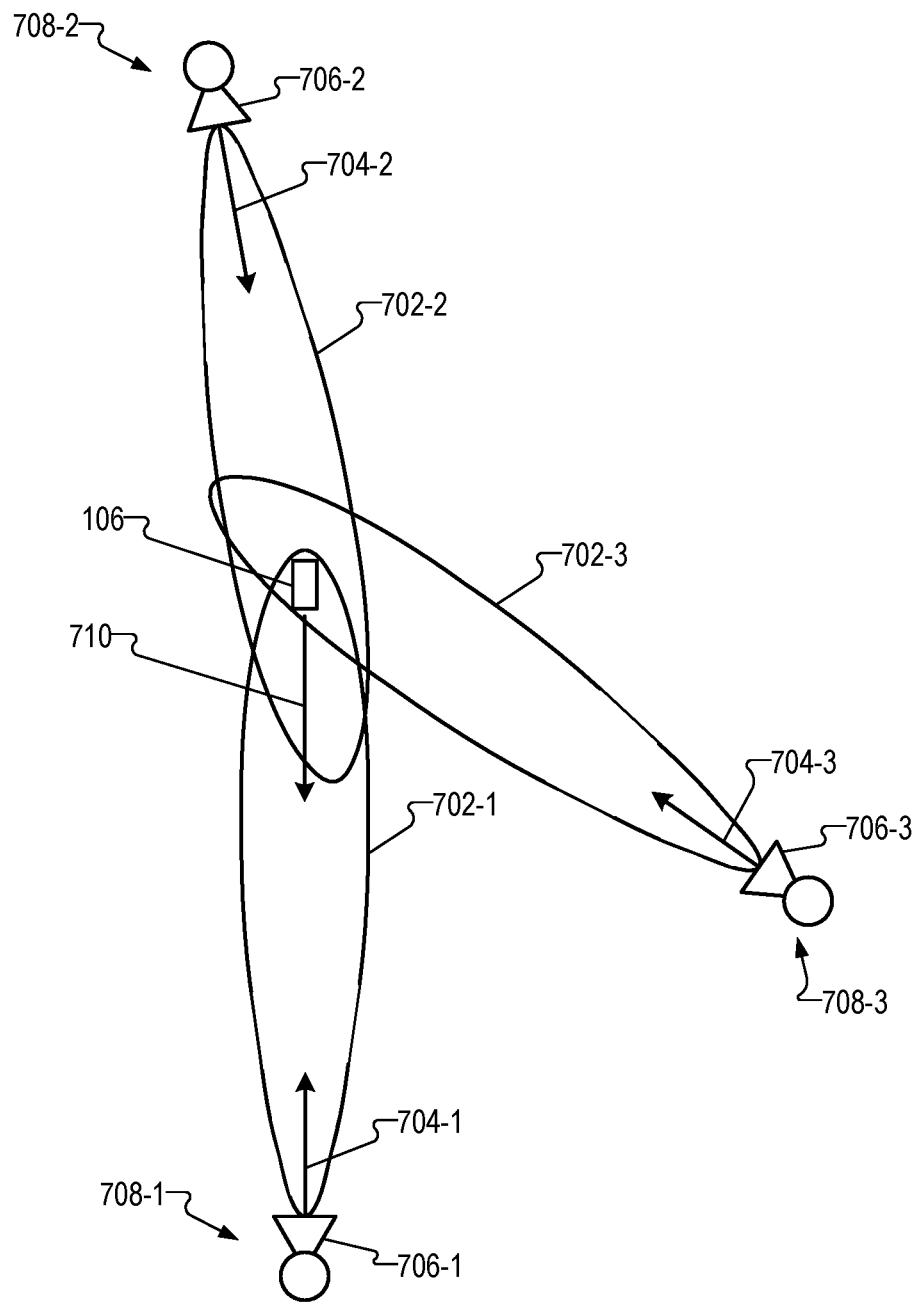

FIG. 7 illustrates radio beams 702-1, 702-2, and 702-3 (collectively "radio beams 702") emitted in directions 704-1, 704-2, and 704-3 (collectively "directions 704") by antennas 706-1, 706-2, and 706-3 (collectively "antennas 706") included in radio beam transmitters 708-1, 708-2, and 708-3 (collectively "radio beam transmitters 708"). Radio beams 702 may be narrow beams in high frequency bands that can be emitted in specific directions, such as millimeter wave radio beams.

FIG. 7 further illustrates UE 106 located within the footprints of radio beams 702 and moving in a direction 710 toward antenna 706-1. UE 106 may sample strengths of radio beams 702 received by UE 106 over time and report the sampled signal strengths to one or more network devices of wireless network 102, such as network device 106. As UE 106 moves in direction 710, the sampled signal strengths of radio beams 702 will change. For example, sampled signal strengths of radio beam 702-1 will increase, sampled signal strengths of radio beam 702-2 will decrease, and sampled signal strengths of radio beam 702-3 may decrease as UE 106 moves toward the periphery of radio beam 702-3 and then decrease at a significant rate as UE 106 moves outside the footprint of radio beam 702-3.

Network device 104 may receive the signal strengths reported by UE 106 directly from UE 106 and/or from one or more other network devices. Network device 104 may use the reported signal strengths to determine a direction of movement of UE 106. For example, network device 104 may maintain or access information about antennas 706 and/or radio beams 702, which information may indicate the directions 704 in which radio beams 702 are emitted. Network device 104 may determine, from this information and signal strengths reported by UE 106, a direction of movement of UE 106. For example, network device 104 may determine that UE 106 is moving in direction 710 based on triangulation principles applied to known directions 704 in which radio beams 702 are emitted and the sampled signal strengths of radio beams 702 reported by UE 106.

In the example depicted in FIG. 7, network device 104 may determine that UE 106 is moving toward antenna 706-1 in direction 710. Network device 104 may include the determined direction 710 of movement of UE 106 in the location information determined by network device 104.

In certain examples, network device 104 may determine additional or alternative information to be included in the location information. For example, network device 104 may be configured to determine a speed of movement of UE 106 based on a rate of change of signal strengths of radio beams 702 reported by UE 106. As another example, network device 104 may be configured to determine an estimated geographic position of UE 106 based on triangulation principles applied to known geographic locations of antennas 706, known directions 704 in which radio beams 702 are emitted, and the sampled signal strengths of radio beams 702 reported by UE 106.

After network device 104 determines location information for UE 106, network device 104 may encode and transmit the location information to UE 106. In certain implementations, network device 104 may encode the location information in a resource assignment signal that is configured to assign a resource of wireless network 102 for use by UE 106.

A resource of wireless network 102 may include any asset of wireless network 102 and/or asset that is reserved for use by wireless network 102. For example, a resource of wireless network 102 may include a processing resource (e.g., processing bandwidth), a communication resource (e.g., transmission bandwidth), a memory resource, airspace allocated to wireless network 102 such as specific frequency bands and/or time slots that may be used to carry wireless signals to/from UEs connected to wireless network 102, and/or any other resource that may be used by network devices of wireless network 102 and/or UEs connected to wireless network 102 for interaction with wireless network 102. One or more such resources of wireless network 102 may be assigned for use by UE 106 to interact with wireless network 102.

Resources of wireless network 102 may be provided at any suitable layer of a protocol stack implemented by wireless network 102. Accordingly, certain resources of wireless network 102 may be physical resources that are implemented and assigned at a physical layer (layer-1) of the protocol stack. For example, physical resources of wireless network 102 may include specific frequencies, frequency bands, carriers, subcarriers, and/or time slots that may be used for wireless transmission of signals to/from UEs connected to wireless network 102. Examples of such physical resources include physical resource elements, physical resource slots, and physical resource blocks (PRBs). A PRB is a specific number of subcarriers (covering specific frequencies) allocated for a specific amount of time (a time slot). Network device 104 may be configured to assign PRBs to UE 106 for use by UE 106 to communicate with network device 104. Network device 104 may be configured to encode PRB assignments in a resource assignment signal and transmit the resource assignment signal to UE 106 to issue the PRB assignments.

A resource assignment signal may be any signal that may be transmitted from network device 104 to UE 106 and that may assign resources of wireless network 102 for use by UE 106. A resource assignment signal that assigns physical resources of wireless network 102 may be referred to as a physical resource assignment signal. A resource assignment signal that assigns PRBs of wireless network 102 may be referred to as a physical resource block assignment signal. A physical resource block assignment signal may be transmitted by network device 104 to UE 106 to assign PRBs for use by UE 106.

As mentioned, network device 104 may encode location information in a resource assignment signal that is configured to assign a resource of wireless network 102 for use by UE 106. Network device 104 may be configured to encode the location information in a resource assignment signal in any suitable way such that the resource assignment signal may indicate both the resource assignments and the location information to UE 106.

In certain implementations, network device 104 is configured to encode the location information as a pattern of PRB assignments in a PRB assignment signal (e.g., in a PRB assignment frame). For example, a pattern of PRBs may be defined in advance to represent certain location information, and when the certain location information is determined by network device 104, network device 104 may select the pattern of PRBs to be assigned to UE 106 in order to represent the location information in a PRB assignment signal. To illustrate, network device 104 may determine that UE 106 is moving in a particular direction and may encode the direction in a PRB assignment signal by selecting a particular pattern of PRB assignments to be assigned to UE 106, where the selected pattern of PRB assignments has been defined to represent the direction.

Figure 8:
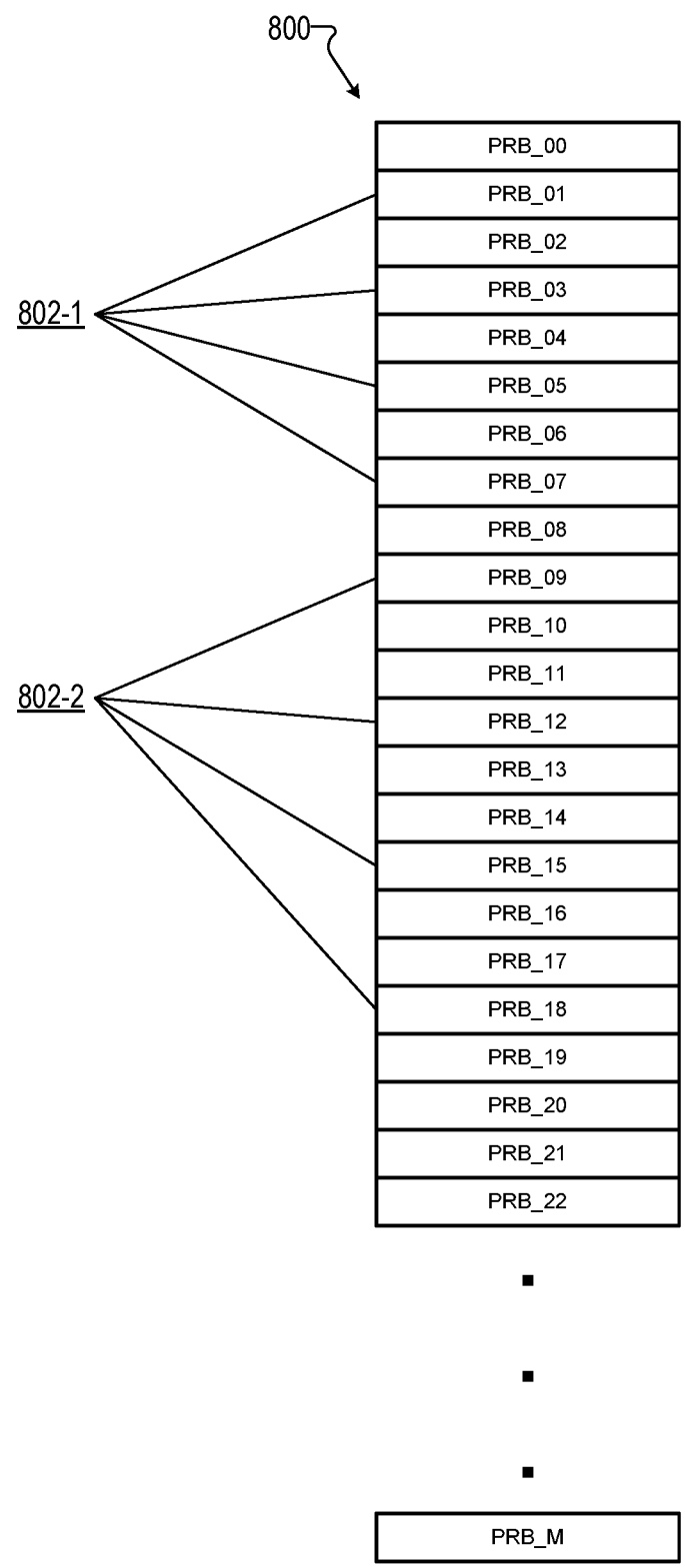
FIG. 8 depicts illustrative patterns of physical resource block assignments according to principles described herein.

FIG. 8 depicts illustrative patterns of PRB assignments that may be selected from an illustrative set 800 of PRBs. As shown, the set 800 of PRBs may include M number of available PRBs. Network device 104 may select, from the set 800 of PRBs, a pattern of PRBs to be assigned to UE 106 to represent specific location information. For example, network devices 104 may select a first pattern 802-1 of PRBs to be assigned to UE 106 to represent first location information or a second pattern 802-2 of PRBs to be assigned to UE 106 to represent second location information.

As shown, first pattern 802-1 includes PRB_01, PRB_03, PRB_05, and PRB_07, which may form a pattern defined to represent the first location information. One or more pattern attributes of first pattern 802-1 may be defined to represent the first location information. As an example, first pattern 802-1 may represent a pattern of sequential odd-numbered PRBs, which pattern may be defined to represent the first location information. As another example, first pattern 802-1 may represent a pattern of every other PRB in a sequence of PRBs, which pattern may be defined to represent the first location information.

Second pattern 802-1 may include one or more pattern attributes that are different from the pattern attributes of first pattern 802-1 and that are defined to represent the second location information. As shown, second pattern 802-2 includes PRB_09, PRB_12, PRB_15, and PRB_18, which may form a pattern defined to represent the second location information. As an example, second pattern 802-2 may represent a pattern of sequential PRBs that are integer multiples of three, which pattern may be defined to represent the second location information. As another example, second pattern 802-2 may represent a pattern of every third PRB in a sequence of PRBs, which pattern may be defined to represent the second location information.

Patterns of resource assignments may be defined to represent location information in any suitable way that allows for one or multiple UEs to be connected to network device 104 and receive resource assignments that indicate the same or different location information for the UEs. For example, the patterns of resource assignments may be defined to be able to use any available PRBs that may form the desired patterns. Accordingly, a pattern of PRB assignments may be formed using various combinations of PRBs and without being limited to specific PRBs. This may allow network device 104 to concurrently encode the same location information, such as the same direction of movement, in different resource assignment signals and send the resource assignment signals to different UEs to make valid assignments of available PRBs and indicate the same location information to the UEs.

Patterns of resource assignments, such as patterns of PRB assignments, may be encoded in a single instance of a resource assignment signal, such as a single PRB assignment signal, or across a set of multiple resource assignment signals conveyed over a period of time, such as a collection of PRB assignment signals conveyed over a period of time. This may allow for flexibility in using patterns of resource assignments to convey additional information to UEs, which may be helpful since PRB assignments can change and the actual number of PRBs can vary across implementations.

While illustrative patterns of PRB assignments have been described as being used to encode location information in PRB assignment signals, this is illustrative only. Additional and/or alternative ways of encoding location information in resource assignment signals may be used in other examples. For example, other ways of encoding location information as resource assignments may be used in other implementations.

After network device 104 has encoded location information in a resource assignment signal, network device 104 may transmit and UE 106 may receive the resource assignment signal. UE 106 may be configured to decode the encoded location information and use the decoded location information in one or more operations of UE 106, such as to determine a geographic location of UE 106. For example, if the resource assignment signal is a PRB assignment signal in which a direction of movement of UE 106 is encoded as a select pattern of PRB assignments being assigned to UE 106, UE 106 may detect the pattern of PRB assignments in the PRB assignment signal and determine that the pattern of PRB assignments represents the direction.

UE 106 may be configured to decode location information from a resource assignment signal in any suitable way, including by using decoder map 312. For example, UE 106 may use decoder map 312 to look up a detected pattern of PRB assignments and find specific location information (e.g., a direction) that is defined to correspond to the detected pattern of PRB assignments.

Network device 104 and UE 106 may use any suitable information to encode and decode location information. For example, network device 104 may utilize a data structure that maps location information such as directions to patterns of PRB assignments to look up a direction and find a pattern that corresponds to the direction. UE 106 may similarly utilize a data structure (the same or a different data structure as used by network device 104) that maps patterns of PRB assignments to location information such as directions to look up a PRB assignment and find a direction that corresponds to the PRB assignment.

FIG. 9 depicts an illustrative data structure 900 that maps directions to patterns of PRB assignments. As shown, data structure 900 may include a table in which rows represent different pairings of a direction to a pattern. Network device 104 may be configured to use data structure 900, or a data structure that includes only a portion of data structure 900 associated with a subset of directions that may be associated with network device 104, to look up a determined direction and find a corresponding pattern to be used to encode the direction in a resource assignment signal. UE 106 may be configured to use data structure 900 to look up a received pattern and find a corresponding direction that may be used by UE 106 in one or more operations of UE 106, such as to perform a dead reckoning process to determine a geographic location of UE 106.

Figure 10:
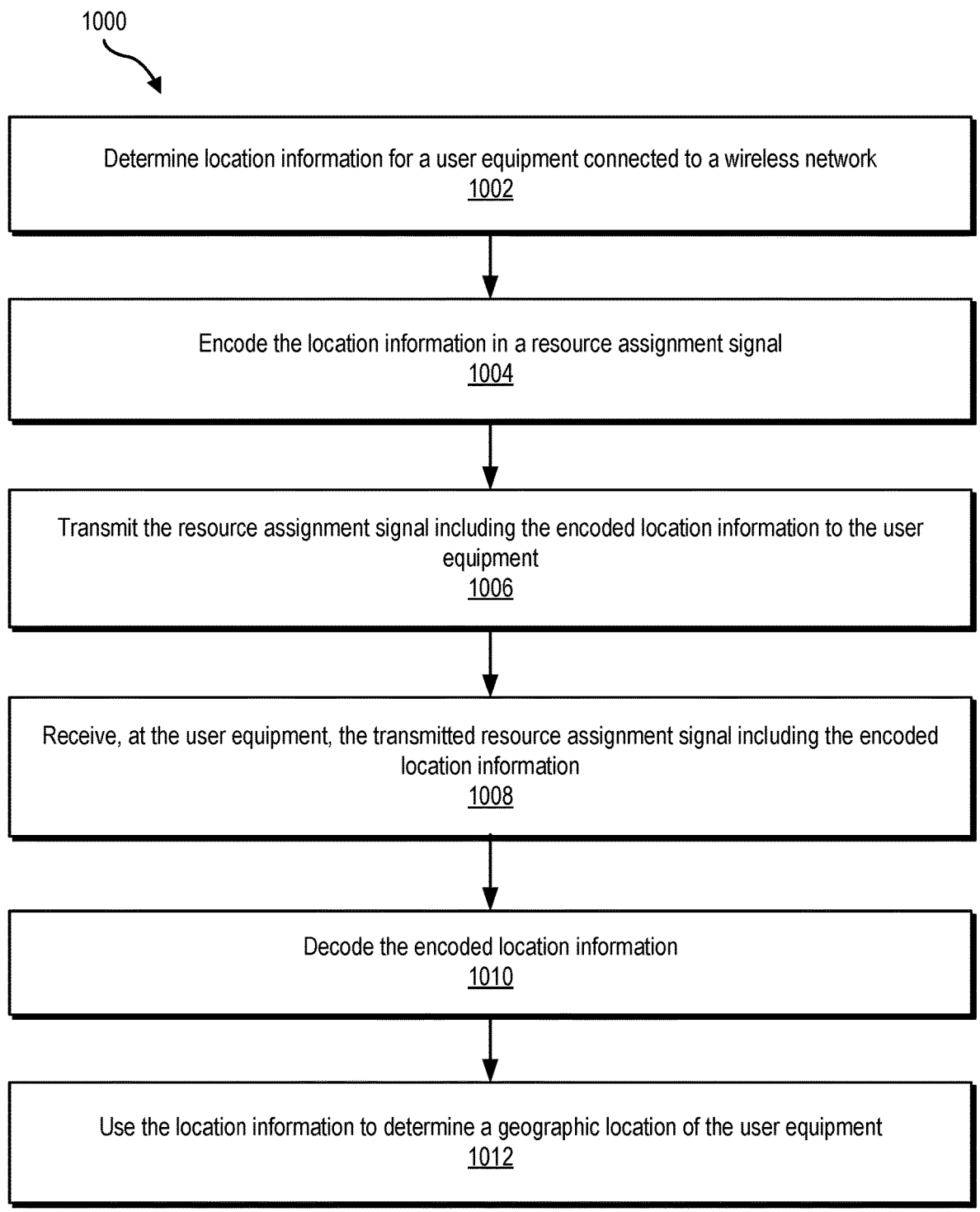
FIGS. 10-11 depict illustrative methods according to principles described herein.

FIG. 10 depicts an illustrative method 1000. While FIG. 10 depicts illustrative operations according to certain embodiments, other embodiments may omit, add to, reorder, and/or modify any of the operations shown in FIG. 10. One or more of the operations shown in FIG. 10 may be implemented and/or performed by UEs such as UE 106 and/or one or more network devices such as network device 104.

Method 1000 includes determining location information for a UE connected to a wireless network (block 1002). For example, network device 104 may determine location information for the UE in any of the ways described herein or in any other suitable way.

Method 1000 further includes encoding the location information in a resource assignment signal (block 1004). For example, network device 104 may encode the location information in a resource assignment signal in any of the ways described herein or in any other suitable way. In certain implementations, the location information is encoded as a set of assignments having an attribute defined to represent the location information in a way that may be detected and decoded by the UE using a decoder map. As described herein, in certain implementations, the location information is encoded as a pattern of PRB assignments in a PRB assignment signal.

Method 1000 further includes transmitting the resource assignment signal including the encoded location information to the UE (block 1006). For example, network device 104 may transmit the resource assignment signal including the encoded location information to the UE in any suitable way, such as by using a transmission signal typically used to carry PRB assignments to the UE.

Method 1000 further includes receiving, at the UE, the transmitted resource assignment signal including the encoded location information (block 1008). For example, UE 106 may receive the transmitted assignment signal including the encoded location information in any suitable way, such as by way of a transmission signal typically used to carry PRB assignments to UE 106.

Method 1000 further includes decoding the encoded location information (block 1010). For example, UE 106 may decode the encoded location information in any suitable way, such as by using a decoder map to look up a pattern of PRB assignments encoded in the received resource assignment signal and find location information that corresponds to the PRB assignments.

Method 1000 further includes using the location information to determine a geographic location of the user equipment (block 1012). For example, UE 106 may use the location information as an input to a dead reckoning process that uses multiple different inputs to determine the geographic location of UE 106. For instance, UE 106 may use the location information together with additional information (e.g., additional location information such as a last-known GPS location of UE 106) to determine the geographic location of UE 106.

Figure 11:
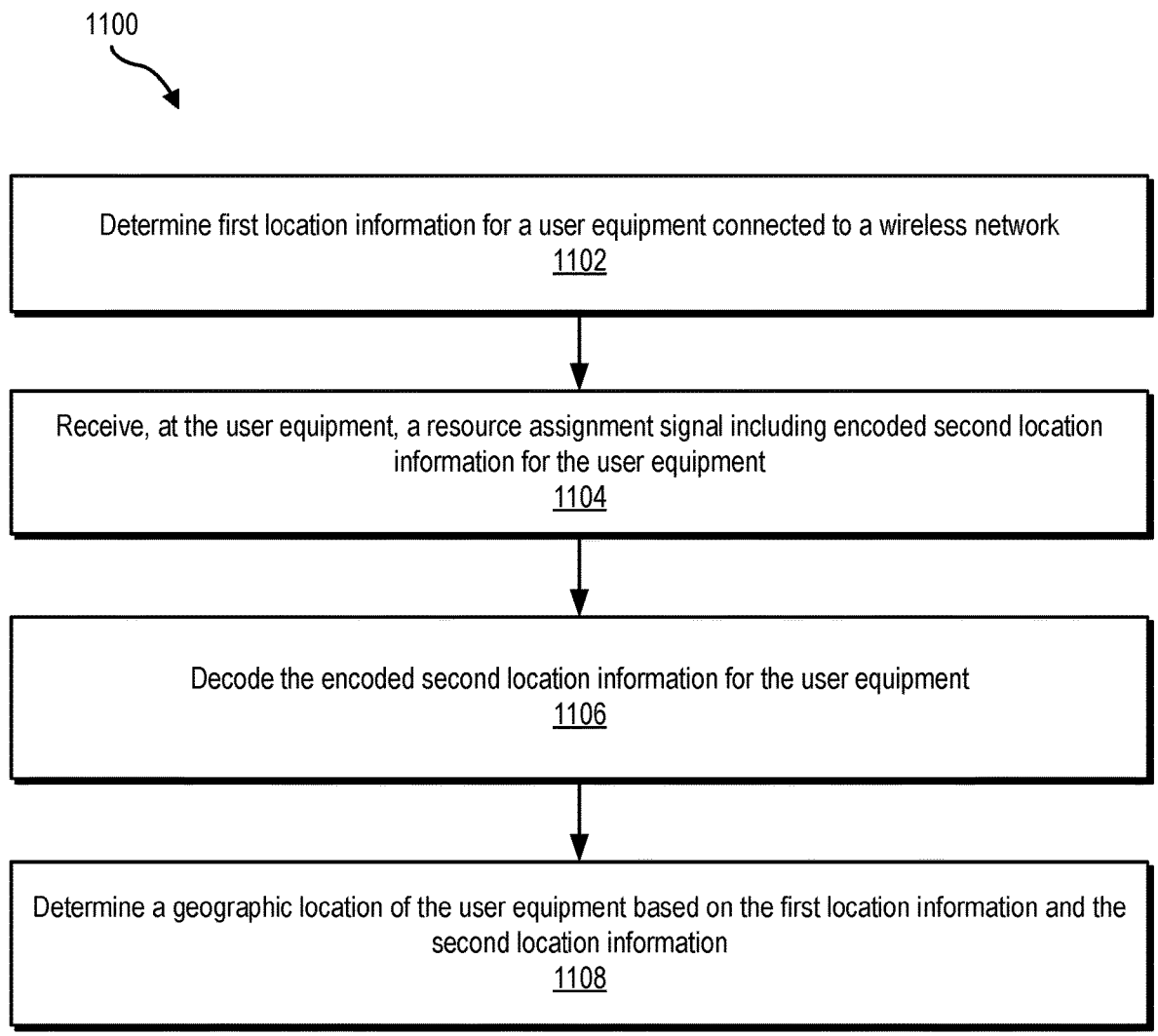

FIG. 11 depicts another illustrative method 1100. While FIG. 11 depicts illustrative operations according to certain embodiments, other embodiments may omit, add to, reorder, and/or modify any of the operations shown in FIG. 11. One or more of the operations shown in FIG. 11 may be implemented and/or performed by UEs such as UE 106 and/or one or more network devices such as network device 104.

Method 1100 includes determining first location information for a UE connected to a wireless network (block 1102). For example, UE 106 may determine first location information for the UE in any of the ways described herein or in any other suitable way. For instance, UE 106 may determine a GPS location of UE 106.

Method 1100 further includes receiving, at the UE, a resource assignment signal including encoded second location information for the UE (block 1104). For example, UE 106 may receive the resource assignment signal from network device 104, which has determined, encoded, and transmitted the second location information to UE 106 as described herein.

Method 1100 further includes decoding the encoded second location information (block 1106). For example, UE 106 may decode the encoded second location information in any suitable way, such as by using a decoder map to look up a pattern of PRB assignments encoded in the received resource assignment signal and find second location information that corresponds to the PRB assignments.

Method 1100 further includes determining a geographic location of the UE based on the first location information and the second location information (block 1108). For example, UE 106 may use the first location information and the second location information as inputs to a dead reckoning process that uses multiple different inputs to determine the geographic location of UE 106. For instance, UE 106 may use the first location information (e.g., a last-known GPS location of UE 106, a speed of movement of UE 106, etc.) together with the second location information (e.g., a direction of movement of UE 106) to determine the geographic location of UE 106.

While certain examples described herein are directed to using resource assignment signals to provide location information to UEs, in other examples resource assignment signals may be used to provide any suitable additional or alternative information to UEs. For example, patterns of PRB assignments may be defined to represent other non-resource-assignment information that may be used by UEs.

While certain examples described herein are directed to using resource assignment signals to provide location information to UEs, in other examples, location information may be provided to UEs using any other suitable wireless communications. For example, network device 104 may be configured to use any suitable communication at any suitable layer of the protocol stack of wireless network 102 to provide determined location information for UE 106 to UE 106.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. System components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EE-PROM, any other memory chip or cartridge, or any other tangible medium from which a computer can read.

Figure 12:
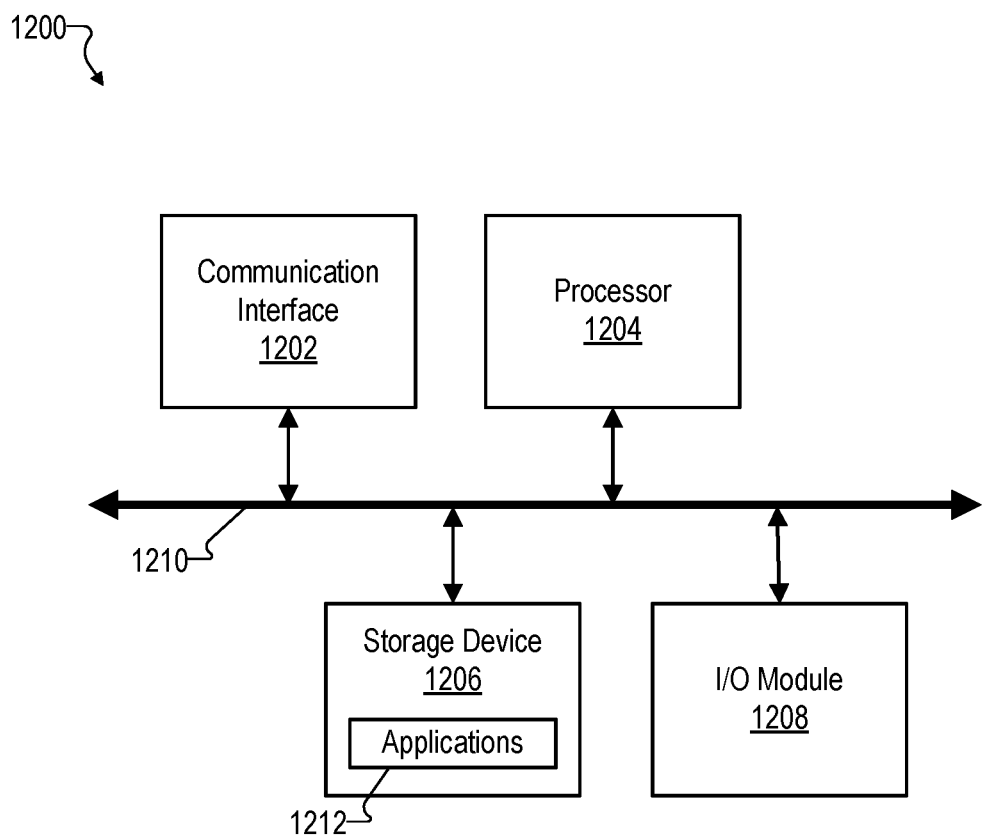
FIG. 12 depicts an illustrative computing device according to principles described herein.

FIG. 12 depicts and illustrative computing device 1200 that may be specifically configured to perform one or more of the processes described herein. For example, computing device 1200 may implement or be included in network device 104 or UE 106.

As shown in FIG. 12, computing device 1200 may include a communication interface 1202, a processor 1204, a storage device 1206, and an input/output ("I/O") module 1208 communicatively connected via a communication infrastructure 1210. While an illustrative computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with communication facility 202, processing facility 206, communication facility 302, location facility 304, or processing facility 308.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    determining, by a network device, location information for a user equipment connected to a wireless network;
    encoding, by the network device, the location information in a resource assignment signal configured to assign a resource of the wireless network for use by the user equipment, the resource assignment signal comprising a physical resource block assignment signal configured to assign a physical resource of the wireless network for use by the user equipment, the location information encoded as a pattern of physical resource block assignments in the physical resource block assignment signal; and
    transmitting, by the network device, the resource assignment signal including the encoded location information to the user equipment.

2. The method of claim 1, wherein the location information indicates a direction of movement of the user equipment.

3. The method of claim 2, wherein determining the location information for the user equipment comprises determining the direction of movement of the user equipment based on:
    a deterministic direction of a millimeter wave radio beam serving the user equipment; and
    a change in signal strength of the millimeter wave radio beam received by the user equipment.

4. The method of claim 1, further comprising:
    receiving, at the user equipment, the transmitted resource assignment signal including the encoded location information;
    decoding the encoded location information; and
    using the location information to determine a geographic location of the user equipment.

5. The method of claim 4, wherein:
    the location information indicates a direction of movement of the user equipment; and
    using the location information to determine the geographic location of the user equipment comprises using the direction of movement indicated by the location information together with information determined by the user equipment to determine the geographic location of the user equipment.

6. The method of claim 1, embodied as computer-executable instructions on at least one non-transitory computer-readable medium.

7. The method of claim 1, wherein:
the physical resource block assignment signal is a single physical resource block assignment signal; and
the location information is encoded as the pattern of physical resource block assignments in the single physical resource block assignment signal.

8. The method of claim 1, wherein:
the physical resource block assignment signal comprises a set of set of physical resource block assignment signals; and
the location information is encoded as the pattern of physical resource block assignments across the set of physical resource block assignment signals.

9. A method comprising:
determining, by a user equipment connected to a wireless network, first location information for the user equipment;
receiving, at the user equipment, a resource assignment signal including encoded second location information for the user equipment, the resource assignment signal comprising a physical resource block assignment signal configured to assign a physical resource of the wireless network for use by the user equipment, the second location information encoded as a pattern of physical resource block assignments in the physical resource block assignment signal;
decoding, by the user equipment, the encoded second location information for the user equipment; and
determining, by the user equipment, a geographic location of the user equipment based on the first location information and the second location information.

10. The method of claim 9, wherein the second location information indicates a direction of movement of the user equipment.

11. The method of claim 10, further comprising determining the direction of movement of the user equipment based on:
a deterministic direction of a millimeter wave radio beam serving the user equipment; and
a change in signal strength of the millimeter wave radio beam received by the user equipment.

12. The method of claim 9, further comprising:
determining the second location information for the user equipment;
encoding the second location information in the resource assignment signal; and
transmitting the resource assignment signal including the encoded second location information from a network device to the user equipment.

13. The method of claim 9, embodied as computer-executable instructions on at least one non-transitory computer-readable medium.

14. The method of claim 9, wherein:
the physical resource block assignment signal is a single physical resource block assignment signal; and
the location information is encoded as the pattern of physical resource block assignments in the single physical resource block assignment signal.

15. The method of claim 9, wherein:
the physical resource block assignment signal comprises a set of set of physical resource block assignment signals; and
the location information is encoded as the pattern of physical resource block assignments across the set of physical resource block assignment signals.

16. A system comprising:
one or more network devices of a wireless network, the one or more network devices configured to:
determine location information for a user equipment connected to the wireless network;
encode the location information in a resource assignment signal configured to assign a resource of the wireless network for use by the user equipment, the resource assignment signal comprising a physical resource assignment signal configured to assign a physical resource of the wireless network for use by the user equipment, the location information encoded as a pattern of physical resource block assignments in the physical resource assignment signal; and
transmit the resource assignment signal including the encoded location information to the user equipment.

17. The system of claim 16, wherein the location information indicates a direction of movement of the user equipment.

18. The system of claim 17, wherein the one or more network devices are configured to determine the location information for the user equipment by determining the direction of movement of the user equipment based on:
a deterministic direction of a millimeter wave radio beam serving the user equipment; and
a change in signal strength of the millimeter wave radio beam received by the user equipment.

19. The system of claim 16, wherein:
the physical resource block assignment signal is a single physical resource block assignment signal; and
the location information is encoded as the pattern of physical resource block assignments in the single physical resource block assignment signal.

20. The system of claim 16, wherein:
the physical resource block assignment signal comprises a set of set of physical resource block assignment signals; and
the location information is encoded as the pattern of physical resource block assignments across the set of physical resource block assignment signals.

* * * * *